(12) United States Patent
Mitchell (10) Patent No.: US 7,834,495 B1
(45) Date of Patent: Nov. 16, 2010

(54) ELECTROMAGNETIC ROTARY ENGINE

(76) Inventor: Jack H Mitchell, 3A Old Coffee Town Rd., Deerfield, NH (US) 03037

( * ) Notice: Subject to any disclaimer, the term of this patent is extended or adjusted under 35 U.S.C. 154(b) by 148 days.

(21) Appl. No.: 12/035,460

(22) Filed: Feb. 22, 2008

(51) Int. Cl.
  *H02K 11/00* (2006.01)
  *H02K 37/00* (2006.01)
(52) U.S. Cl. ...................................... 310/68 B; 310/46
(58) Field of Classification Search ............... 310/68 B, 310/46; 318/258, 400, 400.4
  See application file for complete search history.

(56) References Cited

U.S. PATENT DOCUMENTS

| | | | | |
|---|---|---|---|---|
| 2,578,648 | A | * | 12/1951 | Thomas ........................ 310/46 |
| 4,684,857 | A | * | 8/1987 | Llopis ....................... 318/400.4 |
| 5,192,899 | A | * | 3/1993 | Simpson et al. ............. 318/139 |
| 5,436,518 | A | * | 7/1995 | Kawai ..................... 310/156.18 |
| 2008/0143206 | A1 | * | 6/2008 | Wheeler et al. ............. 310/114 |

* cited by examiner

*Primary Examiner*—Quyen Leung
*Assistant Examiner*—Jose A Gonzalez Quinones
(74) *Attorney, Agent, or Firm*—Joseph F. Funk (57) ABSTRACT

An electromagnetic engine is disclosed which utilizes a plurality of rotors mounted on a common drive shaft. There are permanent magnets mounted on and near the periphery of the rotors. Electromagnets are mounted external to the rotors but adjacent to the periphery of the rotors. A timing means is provided with each rotor to sense the position of the rotor and energize the electromagnets to a first magnetic polarity when the permanent magnets are a predetermined angular distance from an electromagnet. The energized electromagnets attract the permanent magnets and create rotation of the rotors and drive shaft. When a permanent magnet comes into alignment with an electromagnet the electromagnet is de-energized from its first magnetic polarity and is re-energized to the opposite magnetic polarity. This neutralizes the effects of residual magnetism and repels the permanent magnets to also create rotation of the rotors and drive shaft. At the same time different electromagnets associated with a different rotor are energized and the process is repeated. The staggered attraction and repelling of a plurality of permanent magnets and a plurality of electromagnets is converted into a cumulative rotational output of the engine.

7 Claims, 8 Drawing Sheets

ELECTROMAGNETIC ROTARY ENGINE

FIELD OF THE INVENTION

This invention relates to rotary electromagnetic devices in which the motion of rotating members closing a gap between a plurality of magnets and a plurality of electromagnets is transferred into a cumulative rotational output.

BACKGROUND OF THE INVENTION

Electromechanical devices having a rotor driven in discrete steps by the application of electrical current to various fixed electromagnets, and the interaction of those electromagnets with a plurality of movable permanent magnets or other electromagnets are known in the art. Such devices are known as stepper motors.

U.S. Pat. No. 5,448,117 to Elliot describes a stepper motor where the application of current to coils of the fixed electromagnets in accordance with a specific sequence results in continuous rotation of a rotor on which the movable magnets are mounted. However, the manner in which this is done is very complex. There is a stator 12, a rotor 14 and an orbiting ring 16. There are a plurality of electromagnets having coils 58 that extend radially outward as shown in FIG. 3 of that patent. The coils are energized so that adjacent magnetic poles 54 are opposite in polarity, and the polarity of poles is switched. Pairs of poles are cooperatively energized. When two adjacent coils are energized there is a magnetic flux path established between them due to there being an opposite polarity on either side of the air gap between each pair of poles and the adjacent portions of the armature ring 48. Thus, there is a strong magnetic force between the adjacent cooperating poles and the adjacent part of the armature ring 48 which pulls the adjacent part of the armature ring against those poles. Thus, an armature ring 48 is held against the ends of two cooperating poles 54.

To achieve rotational force of the stepper motor electrical current is applied to the coils of the electromagnets in a timed sequence. The interruption of current through one coil of a first pair of adjacent coils, but not the other coil of the pair, together with the application of current through one of the two coils of an adjacent second pair of coils, but not the other coil of the pair, results in a rocking movement of the orbiting ring in that the air gap between orbiting ring and the one of the two coils of the second adjacent pair of coils is closed while the air gap between the coil of the first pair of adjacent coils is opened. This rocking action results in the orbiting ring being moved between a number of stable positions. "The rotational component of the rotational motion of orbiting ring 16 is transferred to rotational motion of drive shaft 34 by means of contact of the various rollers 46, rotatably mounted on ring 16, and apertures 45 in drive plate 36." "Movement of orbiting ring 16 to the next stable position includes a rotational movement of the ring 16 with a roller 46 rolling in contact with the adjacent surface of an aperture 45. As the contacting roller 46 moves out of contact, another roller 46 comes into contact with another aperture 45. Since there is an overall rotational component to the motion of orbiting ring 16, an overall rotation is imparted to drive plate 36 by rollers 46 coming successively into contact with the surfaces of apertures 45. Alternatively, projections similar to rollers 46 may extend radially outward from ring 16 to radially inward facing apertures on drive wheel concentric with ring 16." This is a very complex operation.

In an alternative embodiment described in the Elliot patent "the cumulative rotation of ring 16 is transferred into rotary motion by the operation of rollers 46 in slots 45 of drive plate 36 . . . " Thus the method by which rotational motion is achieved in the '117 patent is very complex.

Thus, there is a need in the prior art for a simplified way to achieve smooth, continuous rotational motion with a rotary electromagnetic device that has a rotor driven in discrete steps by the application of electrical current to various fixed electromagnets, and the interaction of those electromagnets with a plurality of movable permanent magnets or other electromagnets.

SUMMARY OF THE INVENTION

The need in the prior art for a simplified way to achieve smooth, continuous rotational motion with a rotary electromagnetic device that has a rotor driven in discrete steps by the application of electrical current to various fixed electromagnets, and the interaction of those electromagnets with a plurality of movable permanent magnets or other electromagnets is achieved by the present invention.

An electromagnetic rotary engine is disclosed that utilizes timed, sequential electrical current pulses applied to a plurality of spaced electromagnets in the engine to energize them in a manner that produces a force that rotates a drive shaft of the engine. The electromagnets are all mounted on fixed surfaces. The electromagnets are divided into groups of four electromagnets and each group lies in one of a plurality of spaced, parallel planes that are perpendicular to the drive shaft.

There is a plurality of spaced permanent magnets mounted on and around the edges of a plurality of circular rotors that are attached to the drive shaft in a perpendicular orientation. Each rotor is positioned adjacent and parallel to one of the planes in which the electromagnets lie. The permanent magnets are divided into groups of four electromagnets and each group is mounted on one of the circular rotors. On the edge of each circular rotor the permanent magnets are spaced every ninety degrees. The timed, sequential electromagnetic fields created by sequentially pulsing the electromagnets in two opposite polarities interact with the magnetic fields of the permanent magnets mounted on the rotors to provide a force that rotates the drive shaft in a continuous manner.

In a first embodiment of the invention the four electromagnets in each plane are all mounted to be in the same circular, equally spaced order and the electromagnets are positioned to have the same angular offset with respect to the vertical from plane to plane. The four permanent magnets on each rotor are also mounted near its edge to be in the same circular, equally spaced order, but the permanent magnets on each rotor are angularly offset from the permanent magnets on the other rotors.

In a second embodiment of the invention the four electromagnets in each plane are all mounted to be oriented in the same circular, equally spaced order and not angularly offset from each other, but the electromagnets in each plane are mounted to be angularly offset from the electromagnets in all the other planes. The permanent magnets are also mounted in the same circular, equally spaced order around the edges of each rotor, and the permanent magnets on each rotor are in the same angular position with respect to the vertical as the permanent magnets on the other rotors.

As each electromagnet of the plurality of electromagnets is energized in a first polarity it attracts a nearby permanent magnet on an adjacent rotor, thus creating a force to rotate the drive shaft. Due to a specific timing of energizing all the electromagnets there is a continuous force created to rotate the drive shaft. The four electromagnets in each plane are concurrently energized once every ninety degrees of rotation of the drive shaft. At the end of energizing an electromagnet in the first polarity to attract a permanent magnet the electromagnet is energized in its opposite, second polarity to both overcome any residual magnetism therein that tends to hold the electromagnet, and to also repel the permanent magnet to achieve additional rotational force on the drive shaft.

Timing of energization of the electromagnets in each plane is associated with the adjacent rotor and is accomplished by control electronics means. There are four elongated slots cut through each rotor, one slot near but offset from each permanent magnet. There is an LED or other light source mounted apart from but very near a first side of the rotor. There is a photo detectors mounted apart from but very near a second side of the rotor. The light source and photo detector are in line with each other on opposite sides of each rotor. As the engine operates and the rotor turns the slots will pass between each light source and photo detector pair every quarter turn of the drive shaft. The offset elongated slots cause light from the light source to be detected by the photo detector a predetermined number of degrees before a permanent magnet is adjacent an electromagnet. The detection of light by a photo detector triggers the energization of the electromagnet in a first polarity. The magnetic fields of an electromagnet and permanent magnet attract each other creating a force that pulls the permanent magnet on the moveable rotor toward the fixed electromagnet. This force causes movement of the rotor which results in rotation of the drive shaft to which the rotor is attached. As the permanent magnet comes to its closest point to the electromagnet, which is adjacent to the electromagnet, the elongated slot has moved far enough that it interrupts the light beam from the light source. The output from the opposing photo detector ceases and this causes the electronic control means to de-energize the adjacent electromagnet from its first polarity and be re-energized in an opposite, second polarity to overcome any residual magnetism in the electromagnet and also to repel the permanent magnet past the adjacent re-energized electromagnet.

With the physical angular offset of rotors and the slots thereon with the first embodiment of the invention, and the physical angular offset of the electromagnets in each plane with respect to the other planes with the second embodiment of the invention, all the electromagnets are timed to be energized and create attracting forces and repelling forces that are in a carefully designed sequential order. This sequential order results in a continuous force being applied to the drive shaft at all times.

BRIEF DESCRIPTION OF THE DRAWINGS

The invention will be better understood upon reading the Detailed Description in conjunction with the drawings in which.

DETAILED DESCRIPTION

Figure 1:
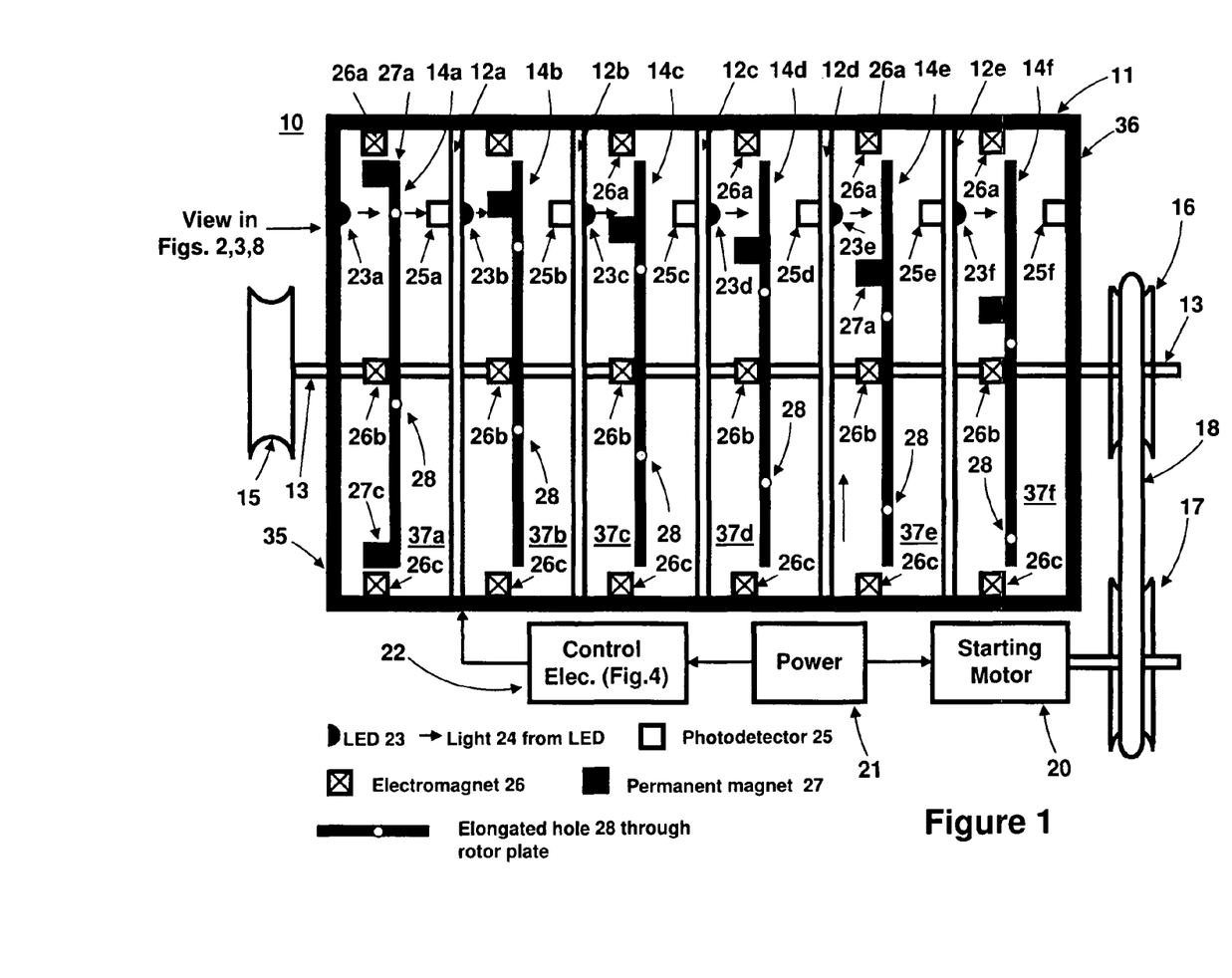
FIG. 1 is a side view of the electromagnetic rotary engine showing the electromagnets, the plurality of rotors and the interspaced fixed surfaces on which are mounted opposing light sources and photo detectors.

FIG. 1 is a side view of the electromagnetic rotary engine 10. There is a housing 11 through which passes a drive shaft 13 to which are permanently fastened six rotors 14*a*-14*f*. Each rotor 14*a*-14*f* lies in one of section 37*a*-*f* that is between two fixed partitions. In FIG. 1 these partitions comprise the end walls 35 and 36 of housing 11 and fixed walls 12*a*-12*e* inside housing 11 that are attached to the outer walls of housing 11. In the embodiment of the invention described with reference to FIG. 1 six sections 37*a*-*f* with rotors 14*a*-14*f* are shown and described, but fewer or more than six sections and rotors may be utilized.

At the left end of drive shaft 13 is a pulley 15 attached thereto which is used to couple the output of engine 10 to a load. Other coupling means may also be utilized. The right end of drive shaft 13 also has a pulley 16 attached thereto. Pulley 16 has a drive belt 18 around it which also passes around another pulley 17 mounted on the drive shaft of a starting motor 20. Rotary engine 10 requires something to momentarily rotate drive shaft 13 in order for engine 10 to commence operating. Drive shaft 13 may be manually turned, or may be turned by the simple starting motor 20 with drive belt 18, or may be momentarily turned by many other means well-known in the art. For the sake of simplicity starting motor 20, momentarily powered by a power supply 21, is shown in FIG. 1. Although not shown in FIG. 1, for the sake of simplicity, when engine 10 is operating normally drive belt 18 must be loosened so that it does not create a continuous load on pulley 16 and thereby drain power from rotary engine 10. Alternatively, starting motor 20 may be remain energized the entire time that rotary engine 10 is running and thereby add additional rotational power to drive shaft 13. In addition, an alternator (not shown) may be driven by rotary engine 10 when it is operating and the output of the alternator may thereafter be used to provide power to engine 10 to keep it running.

Figure 8A:
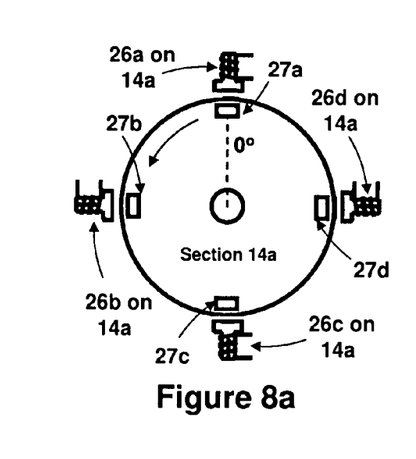
FIG. 8 shows an end view of all the rotors when they are have an angular offset with respect to each other, but the electromagnets have no angular offset with respect to each other, in accordance with a first embodiment of the invention.
Figure 8B:
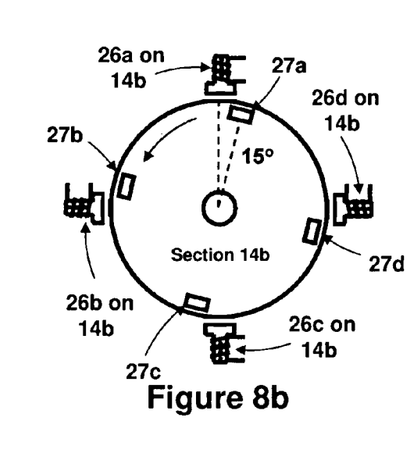

In the first embodiment of the invention shown in FIG. 1 rotor 14*a* lies in a first space or section 37*a* defined by the left end wall 35 of housing 11 and fixed wall 12*a* (see FIG. 8*a*). Rotor 14*b* lies in a second space or section 37*b* defined by fixed walls 12*a* and 12*b* (see FIG. 8*b*).

Figure 8C:
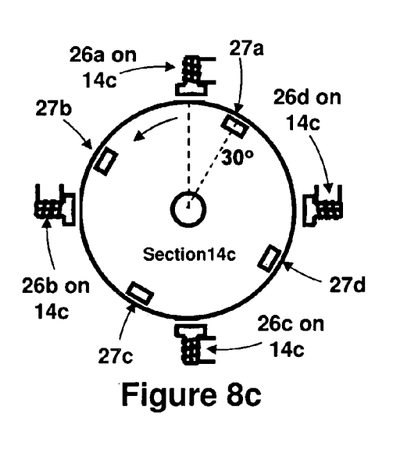
Figure 8D:
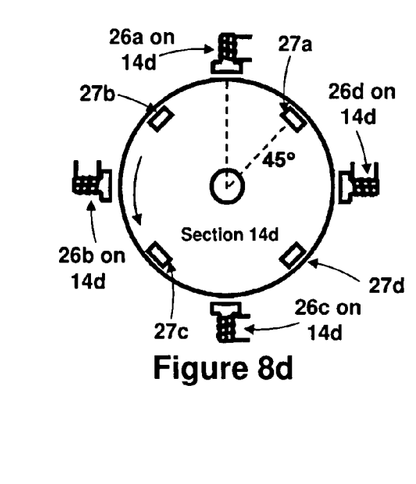
Figure 8E:
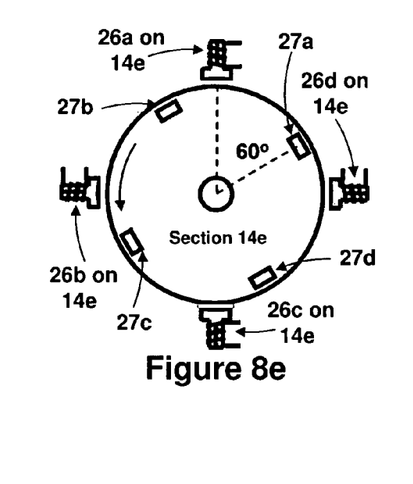
Figure 8F:
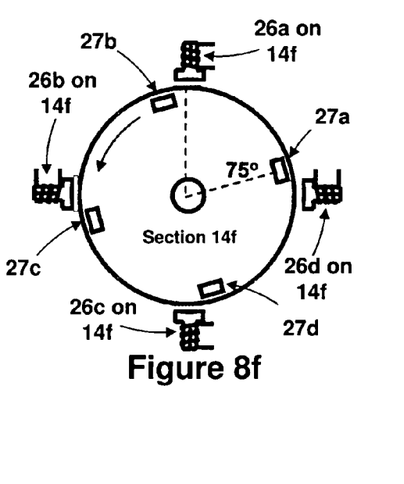
Figure 9A:
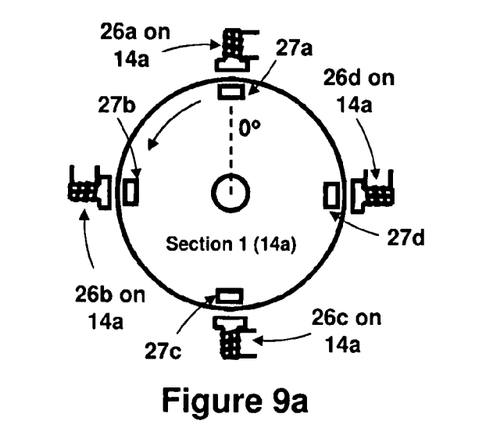
FIG. 9 shows an end view of all the rotors when they have no angular offset with respect to each other, but the electromagnets for each rotor have an angular offset with respect to each other in accordance with a second embodiment of the invention.
Figure 9B:
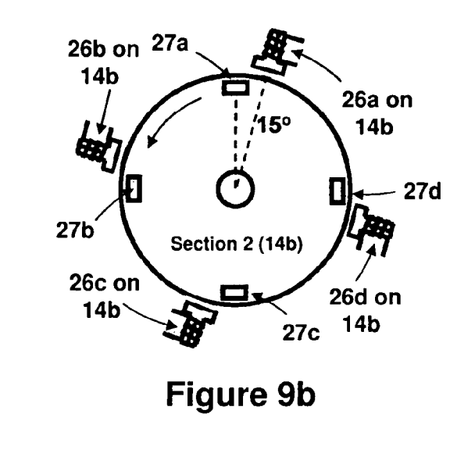
Figure 9C:
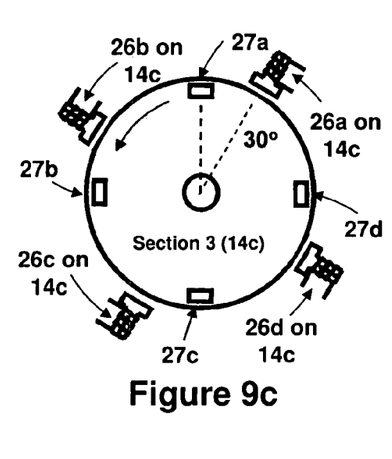
Figures 9D, 9E:
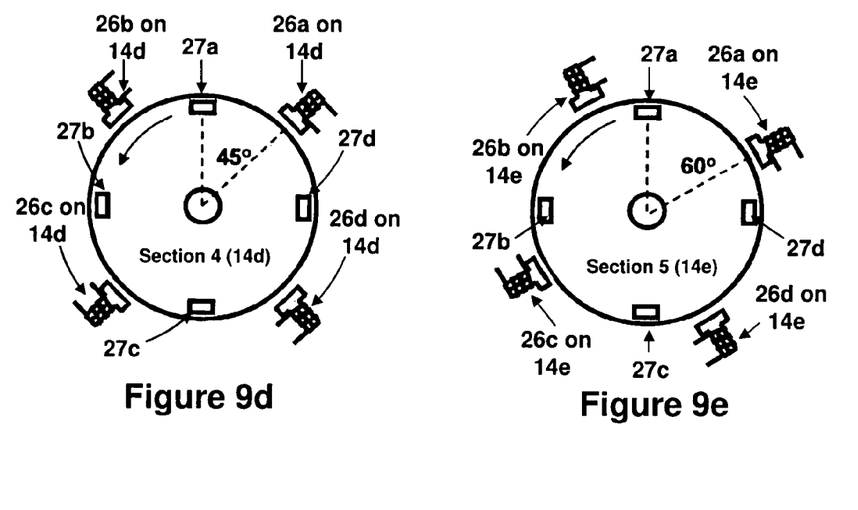
Figure 9F:
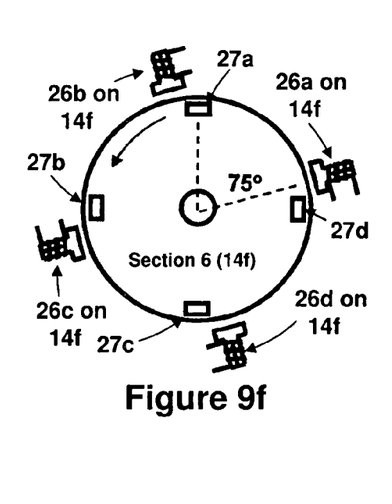

Rotor 14*c* lies in a third space or section 37*c* defined by fixed walls 12*b* and 12*c* (see FIG. 8*c*). Rotor 14*d* lies in a fourth space or section 37*d* defined by fixed walls 12*c* and 12*d* (see FIG. 8*d*). Rotor 14*e* lies in a fifth space or section 37*e* defined by fixed walls 12*d* and 12*e* (see FIG. 8*e*). Finally, rotor 14*f* lies in a sixth space or section 37*f* defined by fixed wall 12*e* and end wall 36 of the engine housing 11 (see FIG. 8*f*). Hereinafter only the terms section or sections are used.

Since all the components in each of the sections 37*a-f* cannot be shown in the side views of FIG. 1 FIGS. 8*a-f* show face views of the rotors 14*a-f* and electromagnets 26*a-d* in the sections and the details are shown.

Inside each of the six sections 37*a-f* described in the previous paragraph there are four electromagnets 26*a-d*. In other configurations of the invention more or fewer electromagnets may be utilized. There are many types of electromagnets known in the prior art and some of them will work with the present invention, but "lift magnets" are the preferred electromagnets. To function with permanent magnets 27*a-d*, or magnetic metal, in each of the sections 37*a-f* all the electromagnets 26*a-d* must be energized using direct current so they have either a first magnetic polarity that attracts the permanent magnets, or a second magnetic polarity that repels the permanent magnets. To avoid cluttering FIG. 1 the electromagnets 26*a-d* are shown as small square boxes with an "X" therein and only a few of the electromagnets have reference numbers shown therewith. The reference numbers 26*a-d* are used in all of the Figures. The electromagnets 26*a*&*c* in the top and bottom of each section 37*a-f* are shown and these are referenced as zero degrees and one-hundred eighty degrees. At the midpoint of ninety degrees another electromagnet 26*b* is shown, but none of the fourth electromagnet 26*d* at two-hundred seventy degrees is shown as they are obscured by the electromagnets 26*b* at ninety degrees. All four electromagnets 26*a-d* in each of the six sections 37*a-f* are better seen in FIGS. 2 and 3 which are face views of the rotors 14*a-f* rather than the side views shown in FIG. 1. All the electromagnets 26*a-d* are attached to fixed surfaces which are the top, front, back and bottom sides of housing 11. At the left side of housing 11 are the words "View in FIGS. 2,3,8" that indicate the direction of the view in those Figures to FIG. 1.

Rotors 14*a-f* are all physically identical and the only difference with the preferred embodiment of the invention is how they are mounted on drive shaft 13. They are all mounted at a different angular offset position with respect to the vertical. This may be seen somewhat in FIG. 1 and particularly in FIGS. 8*a-f*. The progressive fifteen degree angular offsets of rotors 14*a*-fr are best seen in FIGS. 8*a-f*.

Inside each of the six sections 37*a-f* described hereinabove there is mounted one light emitting diode (LED) 23 and one photo-detector 25. Over the six sections they are marked as LEDs 23*a-f* and as photo-detectors 25*a-f*. Components 23, 25 cooperate with four, equally spaced timing holes 28 through each of rotors 14*a-f* to indicate the position of the rotors 14*a-f* to control electronics 22 as is better described hereinafter with reference to FIGS. 2, 3 and 4. The LEDs 23*a-f* are all shown as black semi-circles and the photo-detectors 25*a-f* are all shown as a square with a white center. As shown in FIG. 1, an LED 23 is mounted on the left side of each of sections 37*a-f* and a photo-detector 25 is mounted on the right side of each of sections 37*a-f* directly opposite the LED 23. As described in greater detail further in the specification there are four elongated timing holes 28*a-d* through each of the rotors 14*a-f* that momentarily permit light 24 emitted by each LED 23 in sections 37*a-f* to pass through the holes 28*a-d* and strike a photo-detector 25 as the rotors 14*a-f* turn. With rotors 14*a-f* being shown in a side view of FIG. 1 the elongated holes 28*a-d* are not clearly seen, but they are clearly seen in FIGS. 2 and 3. In FIG. 1 the elongated holes 28*a-d* are represented by the small white circles on the rotors 14*a-f*. In FIG. 1, in section 37*a*, a hole 28*a* is positioned directly between LED 23*a* and photo-detector 25*a* so light may pass through hole 28*a*. In all six sections 37*a-f* of engine 10 shown in FIG. 1 the light emitted by the LEDs 23*a-f* is represented as a small arrow pointing to the right. With the light emitted by LED 23*a* in section 37*a* passing through elongated hole 28*a* the light is represented by a second right facing arrow impinging upon the photo-detector 25*a* in section 37*a*.

Mounted on each of rotors 14*a-f* are four permanent magnets 27*a-d*. The permanent magnets 27*a-d* are spaced every 90 degrees around the periphery of each rotor 14*a-f*. Four permanent magnets 27*a-d* are not shown in each section 37*a-f* in FIG. 1 because an electromagnet 26*b* mounted at ninety degrees obscures the permanent magnets at ninety degrees and two-hundred seventy degrees, but the four permanent magnets 27*a-d* are clearly shown in FIGS. 2,3,8,9.

As is described in greater detail further in this detailed description with reference to FIGS. 8*a-f* the electromagnets 26*a-d* in all sections 37*a-f* of engine 10 are sequentially energized in a timed manner. Each electromagnet 26*a-d* is momentarily energized by control electronics 22 as a permanent magnet 27*a-d* is approaching it, such as shown in section 37*b* in FIG. 1. This is better seen and described with reference to FIGS. 2 and 3. The magnetic fields of each energized electromagnet 26*a-d* and a permanent magnet 27*a-d* interact to first create a force that pulls the permanent magnets toward the electromagnets. The sum total of all such attractive magnetic forces for all of rotors 145*a-f* rotate drive shaft 13. When a permanent magnet 27*a-d* is in line with an electromagnet 26*a-d*, such as shown in FIG. 3, the electromagnets have their magnetic polarity reversed to both overcome any residual attractive magnetic force in the metal of the electromagnet which tends to hold an adjacent permanent magnet against the permanent magnet, and to repel the adjacent permanent magnet to create additional rotational force on the device shaft 13. By removing this residual magnetic force it lets the permanent magnets 27*a-d* coast by the electromagnets 26*a-d*.

More particularly, as the electromagnets 26*a-d* are de-energized so they do not attract the permanent magnets 27*a-d*, the same electromagnets are then energized in an opposite polarity by applying a direct current in the opposite direction through the electromagnets. This reverses the polarity of the magnetic poles of the electromagnets 26*a-d* and any residual magnetism therein is overcome, and the electromagnets 26*a-d* repel the permanent magnets 27*a-d* that have just passed the electromagnets. Thus, the electromagnets 26*a-d* are used to create an attractive force followed by a repelling force on the permanent magnets 27*a-d*. This increases the force that the rotors 14*a-f* apply to drive shaft 13.

The four permanent magnets 27*a-d* on each of rotors 14*a-f* are angularly offset from the permanent magnets mounted on all the other rotors as roughly shown in FIG. 1 and shown in detail in FIGS. 8*a-f* for the first embodiment of the invention.

In the first embodiment of the invention the electromagnets 26a-d in each of the sections 37a-f are not angularly offset from the electromagnets 26a-d in each of the other sections 37a-f as shown in FIGS. 1 and 8a-f.

In a second embodiment of the invention, not shown in FIG. 1 but depicted in FIGS. 9a-f the opposite is true. The permanent magnets 27a-d mounted on each of the rotors 14a-f are not angularly offset with respect to each other, but the four electromagnets 26a-d in each of the six sections 37a-f of engine 10 are angularly offset from the electromagnets 26a-d in all the other sections 37a-f by increments of fifteen degrees.

Figure 2:
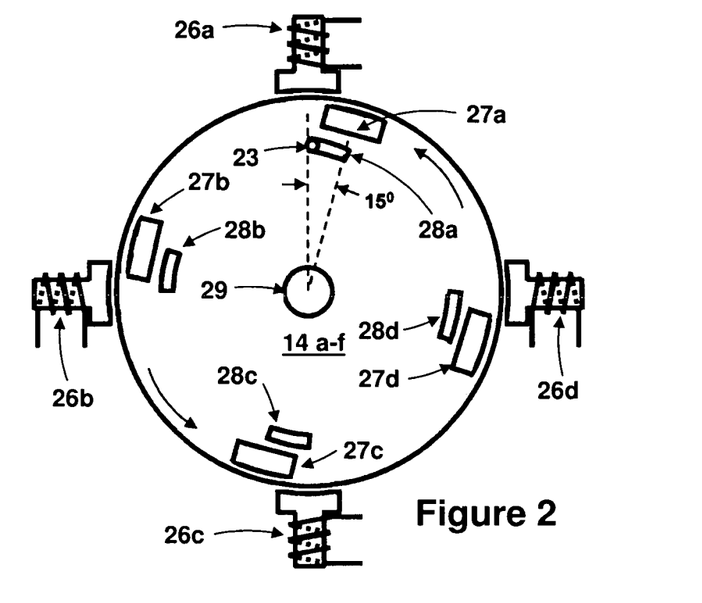
FIG. 2 is a face or front view of one rotor with four permanent magnets thereon, four elongated timing slots through the rotor surface, four electromagnets around the rotor, and a timing light is just commencing to pass through one of the slots to commence energization of the four electromagnets to attract the permanent magnets thereto and thereby turn the drive shaft.
Figure 3:
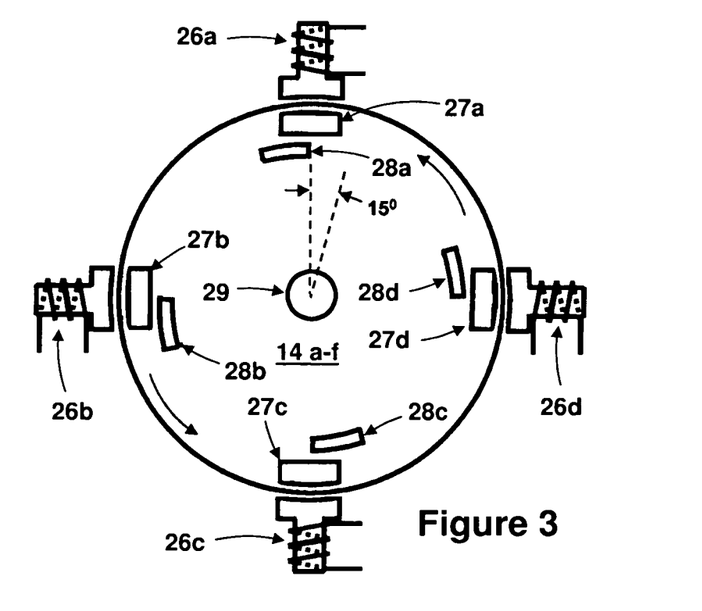
FIG. 3 is a face or front view of the same rotor shown in FIG. 2 with the rotor having rotated fifteen degrees counter-clockwise so the elongated hole is now interrupting the timing light that was passing there through to now de-energize the electromagnets as the four permanent magnets are in alignment with the four electromagnets.

FIG. 2 is a face or front view of a representative one of rotors 14a-f that clearly shows the details of each rotor and the orientation of the electromagnets associated with each rotor. This is the view indicated at the right side of FIG. 1 as "View in FIGS. 2,3,8". All rotors 14a-f are physically identical except that they are angularly offset with respect to each when mounted to drive shaft 13 other as seen in FIGS. 8a-f. The following description sometimes references only one rotor, rotor 14a in section 37a, but the description also applies to all the other rotors 14b-f. Each rotor 14a-f has a central hole 29 through which drive shaft 13 passes (FIG. 1), and each rotor 14a-f is permanently fastened to drive shaft 13 by a fastening means (not shown) but well-known by those skilled in the art. There are four permanent magnets 27a-d mounted adjacent to the outer edge of each rotor 14a-f. These permanent magnets 27a-d are spaced every 90 degrees as shown in FIGS. 2 and 3.

The rotor shown in FIG. 2 is in the position of rotor 14b in section 37b in FIG. 1 and the rotor shown in FIG. 3 is in the position of rotor 14a in section 37a in FIG. 1. In FIG. 2 the four electromagnets 26a-d are shown that are mounted to the engine housing 11 in FIG. 1. The electromagnets 26a-d are spaced every 90 degrees. In the preferred embodiment of the invention the electromagnets 26a-d in each of sections 37a-f are always located at the vertical or zero degrees, at ninety degrees, at one-hundred eighty degrees and at two-hundred seventy degrees. This is seen in FIGS. 1 and 8a-f.

There are four elongated, arctuate timing slots 28a-d through each of rotors 14a-f through which the light from an LED 23 may pass to control the energization of the electromagnets 26a-d. This control is accomplished by control electronics 22 in FIG. 1 and is described in greater detail with reference to FIGS. 4 and 10a-d. Each of the elongated, arctuate slots 28a-d is adjacent to a permanent magnet 27a-d and is parallel to the outer edge of a rotor 14a-f. Each of the elongated slots 28a-d is angularly offset from its adjacent permanent magnet 27a-d by fifteen degrees as shown in FIGS. 2 and 3. In the preferred embodiment of the invention described all the rotors 14a-f rotate in a counterclockwise direction as represented by the two curved arrows adjacent to the outer edge of the rotors between permanent magnets 27a&d and 27b&c in FIGS. 2 and 3. Thus, light from an LED 23 will pass through an elongated hole 28 until its adjacent permanent magnet 27 comes into alignment with an electromagnet 26. In FIG. 2 this is shown as light from LED 23 passing through elongated slot 28a while permanent magnet 27a is not yet aligned with electromagnet 26a. Permanent magnet 27a is angularly offset from electromagnet 26a by fifteen degrees as shown.

As previously described with reference to section 37a in FIG. 1, light 24 emitted by LED 23a passes through an elongated slot 28a and is detected by photo-detector 25a which produces an electrical output signal. The electrical output signal is sent to control electronics 22 in FIG. 1 which causes all four electromagnets 26a-d in section 37a to be energized in a first polarity which attracts the permanent magnets 25a-d.

This is described in more detail with reference to FIGS. 4 and 10a-d. In FIG. 2 the energization of electromagnets 26a-d creates a magnetic field which interacts with the magnetic fields of permanent magnets 27a-d, which are positioned fifteen degrees away from the electromagnets 26a-d, to create an attraction force which pulls each permanent magnet 27a-d toward the nearby electromagnet 26a-d. Permanent magnet 27a is pulled toward electromagnet 26a, permanent magnet 27b is pulled toward electromagnet 26b, permanent magnet 27c is pulled toward electromagnet 26c, and permanent magnet 27d is pulled toward electromagnet 26d. This magnetic attraction creates a force which turns rotor 14a and in turn rotates drive shaft 13 which is fastened to rotor 14.

Once each permanent magnet 27a-d is aligned with an electromagnet 26a-d there is no angular offset between the two and the magnetic attraction will cause the permanent magnets 27a-d to cease moving. To assure continuous rotation of rotor 14 electromagnets 26a-d must be de-energized as the permanent magnets 27a-d come into alignment with the electromagnets. When the electromagnets 26a-d are de-energized there is residual magnetism in their metal cores that will hinder the rotation of the rotors. To counteract this residual magnetism control electronics 22 re-energize the coils of electromagnets 26a-d in their opposite polarity to magnetize the electromagnets in their opposite magnetic polarity. As the permanent magnets then travel by the electromagnets the magnetic fields of the permanent magnets and the electromagnets now repel each other creating a rotational force that also keeps the rotors 14a-f and the drive 13 to which they are fastened rotating in the proper direction.

At this time a different set of electromagnets 26a-d in a different one of sections 37a-f are energized to create an attractive magnetic force to one of the permanent magnets 27a-d therein to continue the rotation of the rotors 14a-f as described above. De-energization of the electromagnets 26a-d and their re-energization in their opposite polarity is described in greater detail with reference to FIGS. 10a-d.

FIG. 3 is a face or front view of the same rotor 14 shown in FIG. 2 with the rotor 14 having rotated fifteen degrees counter-clockwise as a result of the attractive magnetic force created between the electromagnets and permanent magnets. As rotor 14 rotates fifteen degrees counter-clockwise permanent magnets 27a-d comes into alignment with electromagnets 26a-d as shown. In addition, elongated timing hole 28a has also rotated fifteen degrees counter-clockwise and light from LED 23a no longer passes through hole 28a. With no light from LED 23a impinging upon photo-detector 25a there is no electrical signal output from the photo-detector to control electronics 22. As a result, control electronics 22 de-energizes electromagnet 26a-d and there is no more magnetic attraction between electromagnets 26a-d and permanent magnets 27a-d. As previously described, when the electromagnets are de-energized there is residual magnetism in their cores that will hinder the rotation of the rotors. To counteract this residual magnetism control electronics 22 re-energize the coils of electromagnets 26a-d in their opposite polarity to magnetize the electromagnets in their opposite magnetic polarity. As the permanent magnets then travel by the electromagnets the magnetic fields of the permanent magnets and the electromagnets now repel each other creating a rotational force that keeps the rotors 14a-f and the drive 13 to which they are fastened rotating in the proper direction. The rotational force comprises an attractive force followed by a repelling force that each occur for more than fifteen degrees of rotation of each rotor. More particularly, by adjusting the timing of the repelling force the total rotational force may be in the order of thirty degrees.

More particularly, over one-quarter revolution of all rotors and drive shaft 13 the electromagnets 26a-d and permanent magnets 27a-d in section 37a interact as described above to rotate rotor 14a by more than fifteen degrees as described above, then the electromagnets 26a-d and permanent magnets 27a-d in section 37b interact to rotate rotor 14b by more than fifteen degrees, then the electromagnets 26a-d and permanent magnets 27a-d in section 37c interact to rotate rotor 14c by more than fifteen degrees, then the electromagnets 26a-d and permanent magnets 27a-d in section 37d interact to rotate rotor 14d by more than fifteen degrees, then the electromagnets 26a-d and permanent magnets 27a-d in section 37e interact to rotate rotor 14e by more than fifteen degrees, followed by electromagnets 26a-d and permanent magnets 27a-d in section 37f interacting to rotate rotor 14f by more than fifteen degrees. After drive shaft 13 and rotors 14a-f have rotated one-quarter turn or ninety degrees the sequence described in the previous paragraphs is repeated for every ninety degrees, over and over, until engine 10 is turned off. This shown in pictorial form in FIGS. 5, 6 and 7.

In the preferred embodiment of the invention the four electromagnets 26a-d associated with each of the six sections 37a-f in engine 10, as shown in FIGS. 1 and 8a-f, are all oriented the same so there is no angular offset between electromagnets in any of the six sections. This is better seen in FIGS. 8a-f. Instead, the permanent magnets 27a-d on each of rotors 14a-d are angularly offset from the permanent magnets on the other rotors. This is best seen in FIGS. 8a-f. However, in the secondary embodiment of the invention this physical mounting order is reversed. The permanent magnets 27a-d on each of rotors 14a-d are all oriented the same so there is no angular offset between permanent magnets in any of the six sections. The four electromagnets 26a-d in each of sections 37a-d are angularly offset from the electromagnets 26a-d in the other sections 37a-f. This is best seen in FIGS. 9a-f. Despite this difference the operation of engine 10 for both embodiments of the invention is the same.

Figure 4:
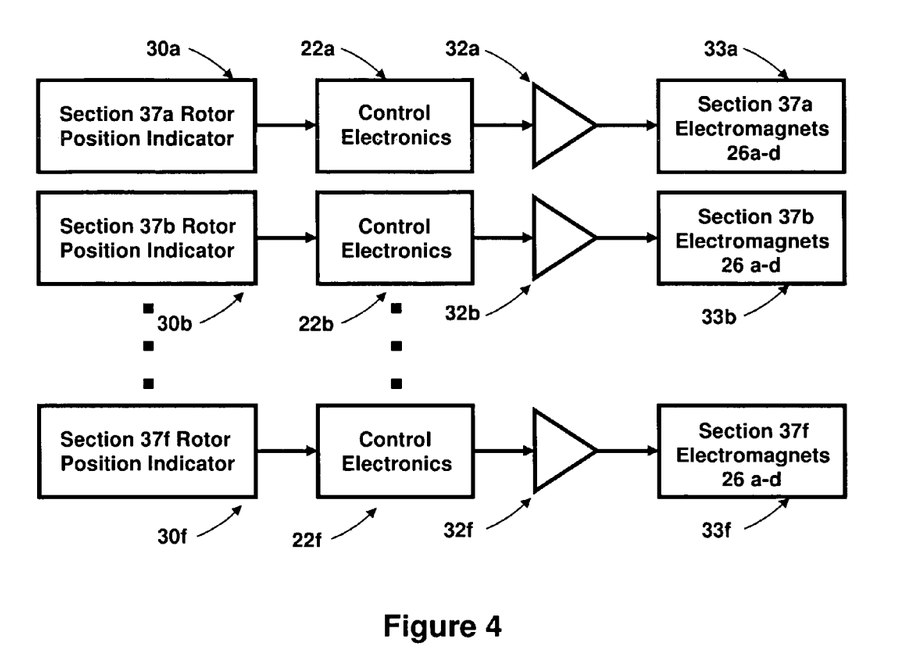
FIG. 4 is a block diagram of the electronic controls that sense the position of the rotors using photoelectric techniques, energize the electromagnets as the permanent magnets near the electromagnets, and de-energize the electromagnets as the permanent magnets come into alignment with the electromagnets.

In FIG. 4 is shown a block diagram of all the electronic controls that sense the position of the rotors 14a-f using photoelectric techniques, energize the electromagnets 26a-d in each of sections 37a-f as the permanent magnets 27a-d near the electromagnets 26a-d, de-energize the electromagnets 26a-d as the permanent magnets 27a-d come into alignment with the electromagnets 26a-d, and re-energize the electromagnets in an opposite polarity. Blocks 30a-f are all identical, blocks 22a-f are all identical and are represented in FIG. 1 by a single block 22, blocks 32a-f are all identical and blocks 33a-f are all identical so a description is given for only one of each type of block.

Block 30a is a Section 37a Position Indicator. This comprises LED 23a, photo-detector 25a in section 37a and arctuate, elongated holes 28a-d through rotor 14a. As previously described these components cooperate to send a signal to control electronics 22 to cause the energization of electromagnets 26a-d in section 37a when the permanent magnets 27a-d are angularly positioned fifteen degrees before the electromagnets 26a-d, as shown in FIG. 2. The result is an attractive force between the permanent magnets 27a-d on rotor 14a and the electromagnets 26a-d. When rotor 14a travels the fifteen degrees the light from LED 23a is interrupted by elongated hole 28a and is not received by photo-detector 25a as shown in FIG. 3. The signal output from photo-detector 25a is terminated. Responsive to the interruption of the signal from photo-detector 25a Control Electronics block 22a ceases its control signals that are used to cause the energization of electromagnets 26a-d in section 37a and their associated circuitry shown in FIGS. 10a-d.

The signal output from control electronics block 22a when electromagnets 26a-d in ones of sections 37a-f are to be energized in their first polarity is amplified by amplifier 32a to provide the power necessary to concurrently energize all four electromagnets 26a-d in section 37a. This creates the attractive force between the permanent magnets and electro-magnets in section 37a that causes rotation of rotor 14a and drive shaft 13. When rotor 14a rotates fifteen degrees counter-clockwise and the light from LED 23a is interrupted the power to the four electromagnets 26a-d in section 37a is terminated by control electronics 22a. Control electronics 22a then reverses the polarity of the power supplied to electromagnets 26a, as previously described, to neutralize residual magnetism in the metal core of the electromagnets and then to repel the permanent magnets to create additional rotational force.

This operation is then sequentially repeated for each of sections 37b-f to create a continuous rotational force on drive shaft 13. Every ninety degrees of rotation of drive shaft 13 this process is repeated in all six sections 37a-f of engine 10. This operation is described in further detail with reference to FIGS. 5, 6 and 7.

Figure 5:
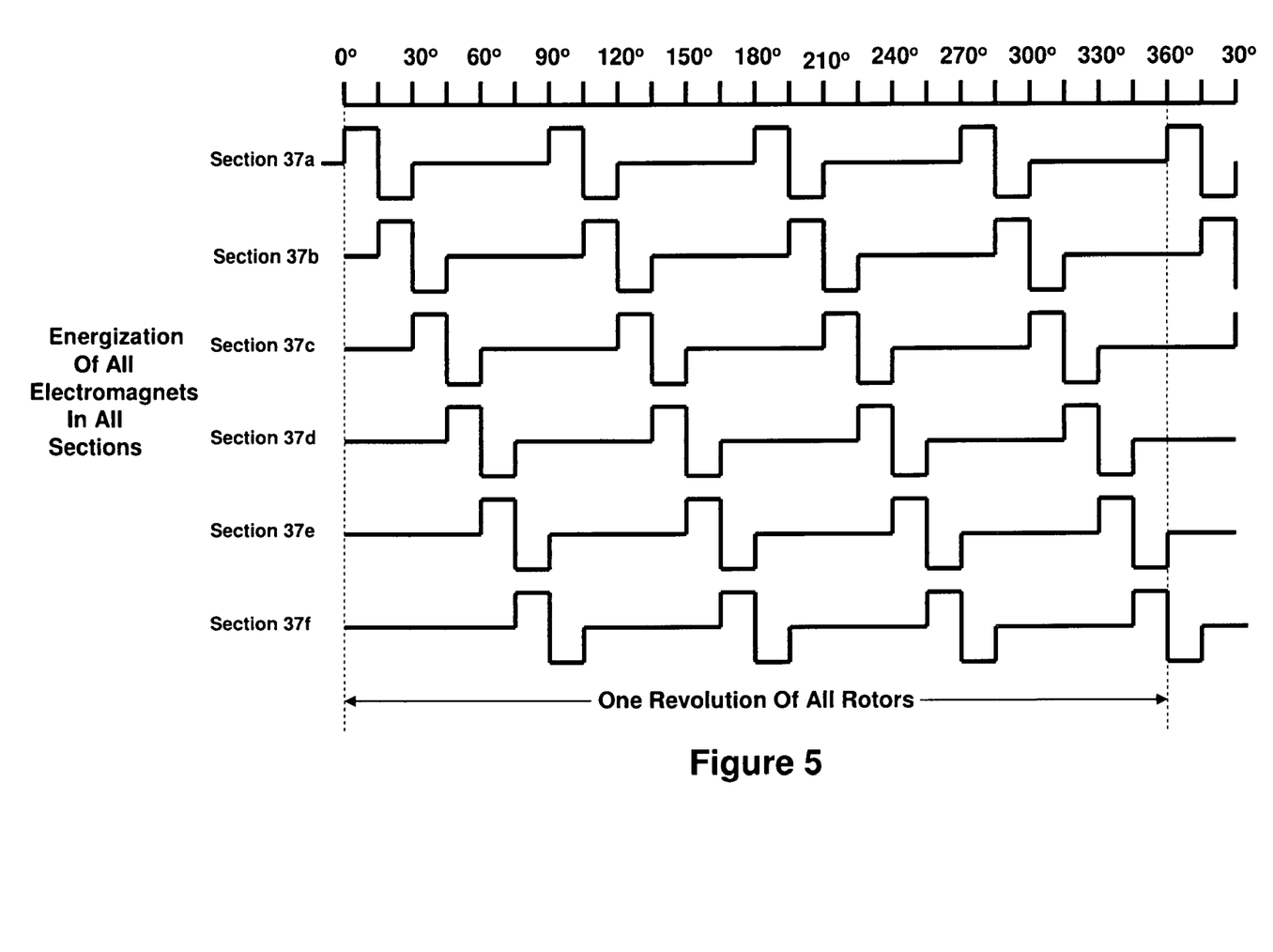
FIG. 5 is a timing diagram showing how the four electromagnets associated with each of the plurality of rotors are energized by control means and associated circuitry once per quarter revolution of the drive shaft to both attract and repel permanent magnets on the rotors to create a continuous rotational force on the drive shaft.

In FIG. 5 is a timing diagram showing how the four electromagnets 26a-d in each of sections 37a-f are sequentially energized by control means 22 and associated circuitry shown in FIGS. 4 and 10a-f once per quarter revolution of drive shaft 13 to create a continuous rotational force on drive shaft 13. In FIG. 5 are six rows, one associated with each of sections 37a-f in engine 10. The timing diagram indicates one complete revolution of all rotors 14a-f which is the same as one complete revolution of drive shaft 13 to which the rotors are attached. It can be seen that the electromagnets 26a-d in each of sections 37a-f are energized four times per revolution of each rotor. The period of energization for the electromagnets 26a-d in each of the sections 37a-f can be seen to be fifteen degrees. As previously described the electromagnets 26a-d in each section 37a-f are energized when the permanent magnets 27a-d rotate to be fifteen degrees from being in alignment with the electromagnets 26a-d. The timing diagram in FIG. 5 reflects this operation. After fifteen degrees of rotation the permanent magnets are in alignment with the electromagnets and will be held there unless the permanent magnets are de-energized. Thus, the need for only energizing the electromagnets 26a-d for periods equal to fifteen degrees of rotation of a rotor 14.

To overcome residual magnetization in the metal cores of the electromagnets 26a-d that hinders the rotation of the rotors 14a-f control electronics 22a-f cause the polarity of the electromagnets to be reversed as previously described. With the residual magnetization being overcome the rotors 14a-d can coast by the electromagnets 26a-d. The reversed magnetic polarization of the electromagnets 26a-d causes the magnetic fields of it and the permanent magnets 27a-d to repel each other to contribute to the rotational force on drive shaft 13. In FIG. 5 the waveforms are shown as adjacent plus and minus square waves. Depending on the amount of residual magnetization in the cores of the electromagnets the negative part of the waveform may be altered. When control electronics 22 reverses the polarity of the electromagnets 26a-d it may be a two step process where initially a lower voltage may be applied to the electromagnets for a brief moment followed by the full voltage to help the magnets repel each other. While the figure of fifteen degrees is used, shown and described herein, stating fifteen degrees before (FIG. 2) and ending when a permanent magnet is directly opposite an electromagnet as shown in FIG. 3, the end point may be one or a few degrees before a permanent magnet is directly opposite an electromagnet. This will allow for energy stored in the magnetic field of an electromagnet to collapse and dissipate as described with reference to FIG. 10b,d before the electromagnets are reverse energized to repel permanent magnets.

While FIG. 5 shows the electromagnets 26a-d being energized in one section 37a-f at a time, it should be understand that the electromagnets 26a-d in more than one section 37a-f at a time may be energized. In addition, while it is described herein that all the electromagnets 26a-d in a section 37a-f are energized at the same time it should be understood that less than all the electromagnets may be energized. For example, only electromagnet 26a in a section 37a-f may be energized during the first quarter revolution of drive shaft 13, only electromagnet 26b in a section 37 a-f may be energized during the second quarter revolution of drive shaft 13, only electromagnet 26c in a section 37 a-f may be energized during the third quarter revolution of drive shaft 13, and only electromagnet 26d in a section 37 a-f may be energized during the fourth quarter revolution of drive shaft 13. Coupled with this staggered energization of electromagnets 26 in any one section 37, an electromagnet in more than one section 37 at a time may be energized.

It can also be seen in FIG. 5 that the energization of electromagnets 26a-d in each of sections 37a-f is angularly offset from the energization of electromagnets 26a-d in all of the other sections 37a-f. This angular offset can be seen to be fifteen degrees. Thus, as the electromagnets 26a-d in section 37a are de-energized the electromagnets 26a-d in section 37b are energized for fifteen degrees of rotation of the rotors 14, and so on for the electromagnets 26a-d in all the other sections 37c-f. With energization of the electromagnets 26a-d in all of the sections 37 being based upon fifteen degrees all electromagnets in all of the sections are energized once per every ninety degrees of rotation of the rotors 14 on drive shaft 13. Thus, the sequential energization of the electromagnets 26a-d in all of sections 37a-f must be repeated four times per complete revolution of rotors 14 and drive shaft 13. This sequential operation is shown in the timing diagram in FIG. 5.

Figure 6:
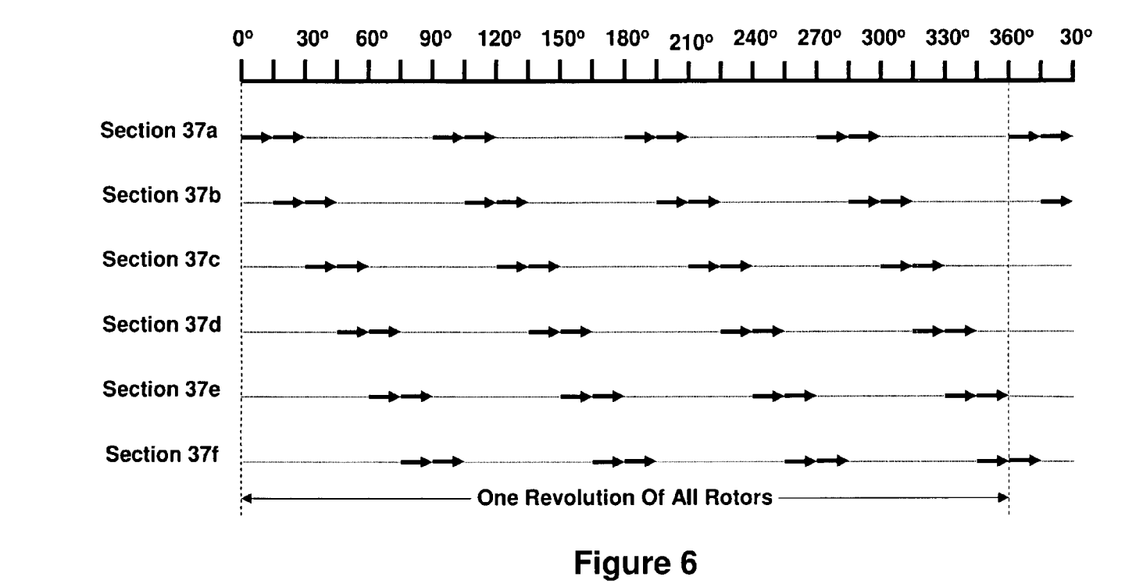
FIG. 6 shows the timed, sequential rotational forces created by the timed sequence of energizing all of the electromagnets.

In FIG. 6 is shown another timing diagram that is similar to the timing diagram showing FIG. 5. However, instead of showing the attracting and repelling energization of the electromagnets 26a-d, as in FIG. 5, the angular force created between ones of permanent magnets 27a-d and energized electromagnets 26a-d when attracting and repelling is shown for all sections 37a-f. Based upon the energization of ones of electromagnets 26a-d in all sections 37a-f being based upon fifteen degrees in the attraction mode and roughly fifteen degrees in the repelling mode, the rotational force created by the interaction of the magnetic fields of the permanent magnets and the electromagnets is as shown in FIG. 6.

Figure 7:
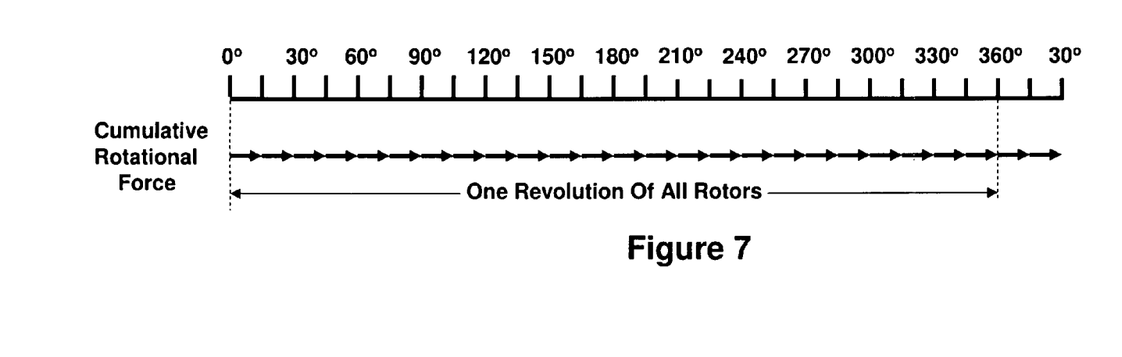
FIG. 7 shows the summation of all the rotational forces created by energizing all the electromagnets in a timed sequence to create a continuous rotational force on the drive shaft.

In FIG. 7 is shown the summation of all the rotational forces created by energizing all of the electromagnets in a timed sequence in the attraction and repelling modes, as shown in FIG. 5, to create the total rotational force shown in FIG. 6. When the rotational forces shown in FIG. 6 are summed as shown in FIG. 7 it can be seen that there is continuous force rotating the rotors 14a-f and drive shaft 13 to which they are attached.

In FIGS. 8a-f is shown an end view of the six rotors 14a-f in sections 37a-f respectively of the preferred embodiment of the invention shown in FIG. 1. While the rotors 14a-f are identical each rotor has an angular offset from all the other rotors that is clearly seen in FIGS. 8a-f. The electromagnets 26a-d in each of sections 37a-f each have no angular offset with respect to electromagnets in the other sections. What is most clearly seen in these Figures is the fifteen degree angular offset of permanent magnets from one section to other sections. The topmost permanent magnet 27a in section 37a (zero degrees) in FIG. 1 is the top most permanent magnet 27a (zero degrees) in FIG. 8a. Due to these angular shifts LEDs 23a-f in sections 37a-f in FIG. 1 will sequentially shine through an elongated timing slot 28a in rotors 14a-f as they rotate. As previously described this will sequentially energize all four electromagnets 26a-d in each of sections 37a-f once every one-quarter turn of the rotors 14a-f and drive shaft 13.

In FIGS. 9a-f is shown an end view of the six rotors 14a-f in sections 37a-f respectively of an alternative embodiment of the invention. In the alternative embodiment of the invention the permanent magnets 27a-d on each of the identical rotors 14a-d are not angularly offset from each other but, rather, the permanent magnets 27a-d on each of rotors 14a-f are angularly offset from each other. The timing effect is the same for both the primary and alternative embodiments of the invention. Due to these angular shifts LEDs 23a-f in sections 37a-f in FIG. 1 will sequentially shine through an elongated timing slot 28a in sections 37a-f every fifteen degrees as the rotors 14a-f rotate. As previously described this will sequentially energize all four electromagnets 26a-d in each of sections 37a-f once every one-quarter turn of the rotors 14a-f and drive shaft 13 and create the rotational forces shown in FIGS. 6 and 7.

Figure 10A:
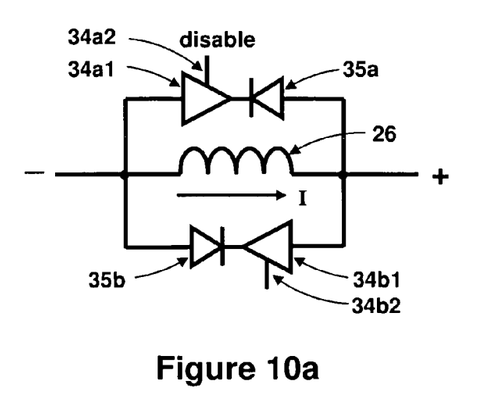
FIG. 10 shows gating amplifiers and diodes mounted in parallel with the coils of all electromagnets and operated by a control electronic means to permit the coils to be energized in a first polarity to attract a permanent magnet, and then be energized in an opposite, second polarity to both overcome any residual magnetism and to repel the permanent magnet.
Figure 10B:
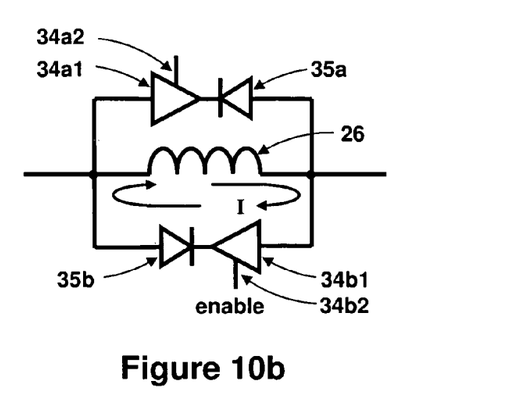
Figure 10C:
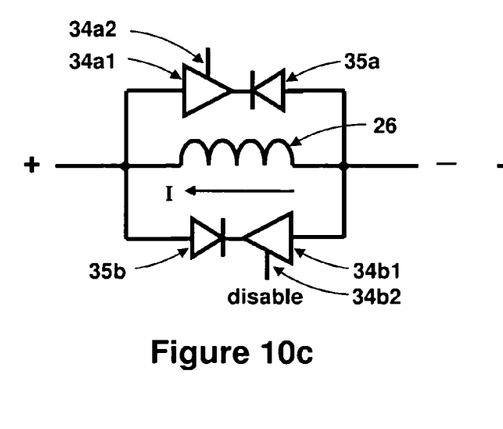
Figure 10D:
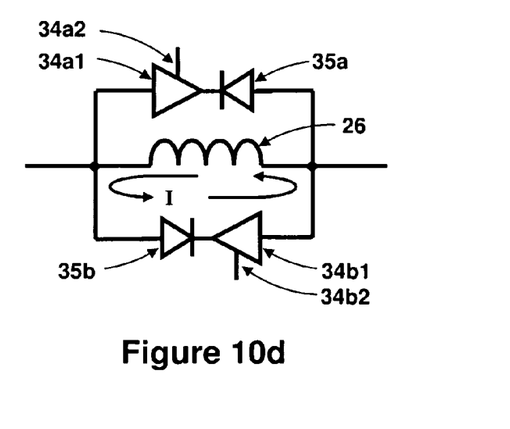

FIGS. 10a-10d show gating amplifiers 34a-b and diodes 35a-b connected in parallel with the coils of the electromagnets 26a-d in each of sections 37a-f and operated by control electronic means 22a-f to permit the coils to first be energized in a first polarity, as shown in FIG. 10a, to attract a permanent magnet, and then be energized in an opposite, second polarity, shown in FIG. 10c, to both overcome any residual magnetism and to repel the permanent magnets 27a-d to create an additional rotational force on drive shaft 13.

When control electronics 22 detects an output from a photo-detector 25a-f in one of the sections 37a-f two steps are taken as shown in FIG. 10a. First, the gating input 34a2 of gating amplifier 34a1 has an input applied thereto which disables amplifier 34a1 so no current can flow through it and diode 35a which would otherwise be forward biased. Diode 35b is reverse biased so no current flows through it and gating amplifier 34b1. Second, the electromagnets 26a-d are energized with a first polarity shown by the plus and minus signs in FIG. 10a. This causes the permanent magnets 27a-d to be attracted to the energized electromagnets 26a-d in one of sections 37a-f at a time.

When the permanent magnets 27a-d are aligned with the energized electromagnets 26a-d, the signal output from the photo-detector 25a-f mentioned in the previous paragraph ceases. Responsive thereto control electronics 22 performs two steps. First, as seen in FIG. 10b gating amplifier 34b1 has a signal applied to its gate 34b2 which places the amplifier in its conductive state and current can now flow through diode 35b. Second, the first polarity previously applied to the coils of the electromagnets 26a-d are removed as shown in FIG. 10b. There is energy stored in the magnetic field around the coil of the previously energized electromagnets 26a-d that must be dissipated in a manner known in the art. As the magnetic field around the coil of electromagnet 26 collapses it causes a loop current Ito flow that is represented by the looped arrows. With gating amplifier 34b1 now being in its conductive state and diode 35b now being forward biased, the loop current can flow through them and dissipate the stored energy. Diode 35a is reverse biased so no current can flow there through.

The residual magnetism in the iron core of the previously energized electromagnets 26a-d (FIG. 10a) tends to slow the rotor and permanent magnets thereon from rotating. To overcome this residual magnetism control electronics 22 performs two steps as shown in FIG. 10*c*. First the gating input 34*b*2 of gating amplifier 34*b*1 has an input applied thereto which disables amplifier 34*b*1 so no current can flow through it and diode 35*b* which would otherwise be forward biased. Diode 35*a* is reverse biased so no current flows through it and gating amplifier 34*a*1. Second, the electromagnets 26*a-d* that were energized are re-energized with a second, reversed polarity shown by the reversed plus and minus signs in FIG. 10*c*. Thus, the electromagnets 26*a-d* all have their magnetic polarity reversed. This reverse polarity first overcomes the residual magnetization and then causes the close permanent magnets to be repelled from the reverse polarized electromagnets 26*a-d* to increase the rotational force on drive shaft 13. As previously mentioned the reverse energization of the electromagnets may have a first level that just neutralizes the residual magnetism, followed by an increase to a higher level for repelling the permanent magnets.

While six sections 37*a-f* are shown and described herein, a different number of sections 37 may be utilized. When three sections 37 are utilized, with four permanent magnets and four electromagnets the angular offset utilized will be thirty degrees.

In a third embodiment of the invention, not shown in the figures, the electromagnets 26*a-d* may be energized in a slightly different order. In the first and second embodiments of the invention the direct current electromagnets 26*a-d* in one of sections 37*a-f* are sequentially energized to attract the permanent magnets 27*a-d*, then the electromagnets are de-energized and reverse energized while the electromagnets 26*a-d* in a different section 37*a-f* are energized. In the third embodiment of the invention the electromagnets may be energized in other than a physical sequential order. For example, electromagnets 26*a-d* in more than one section 37*a-f* may be energized at a time, and the sections may not be adjacent to each other.

In a fourth embodiment of the invention pieces of a magnetic material may be mounted on each rotor in lieu of the permanent magnets 27*a-d*. With this arrangement the electromagnets 26*a-d* in all sections 37*a-f* may be energized using direct current or alternating current. The energized electromagnets 26*a-d* will attract the metal pieces and create the attractive force necessary to make each rotor 14*a-f* turn and thereby rotate drive shaft 13. There is mo way to create a repelling magnetic force.

Alternatively, a light source and photo-detectors may be positioned outside the section 37*a-f* and fiber optic or plastic "light pipes" (not shown) may be used to transmit light into and out of the sections. Transmit and receive piece of light pipes are channeled into each section and mounted on a side wall of each section so that the ends of both pieces face each other with a small gap in between, a gap wide enough to permit a thin piece of material to pass through. The thin piece of material is mounted perpendicular to each rotor 14*a-f* and the plane of the material is parallel to the outer periphery of the rotor. The position of the piece of material on each rotor is the same as the elongated slots. As the rotor turns the material passes between the two pieces of light pipe to interrupt the light beam. The thickness of the material being thin it passes easily between the opposing ends of the two pieces of light pipe. The width of the material interrupts the light beam passing between the transmit and receive pieces for the same fifteen degrees previously described.

While a preferred and some alternative embodiments of the invention are described hereinabove, those skilled in the art will recognize that numerous other changes may be made without departing from the spirit and scope of the invention. For example, in lieu of an LED and photo-detector with timing slots to trigger the electromagnets, a permanent magnet may be mounted on each rotor and a pickup coil may be mounted on a side wall. Each time the permanent magnet passes the pickup coil a pulse will be induced therein that can be used to trigger energization of the electromagnets every fifteen degrees or thirty degrees depending on the number of rotors.

What is claimed is:

1. An electromagnetic rotary engine having a drive shaft and a power supply to drive the engine, the engine comprising:

a plurality of rotors attached to the drive shaft;

a plurality of permanent magnets spaced around and near the edges on each of the rotors;

a plurality of electromagnets spaced around but separate from, and positioned adjacent to each of the rotors;

means to indicate the position of each rotor as it turns;

a first means for energizing each electromagnet to a first state to create a first magnetic polarity that causes the permanent magnets to be attracted to the electromagnets and rotating the drive shaft in a first direction when the position indicating means indicates that a permanent magnet is a predetermined distance before rotating in the first direction to be opposite to an energized electromagnet, and the energizing means ceases energizing each electromagnet when the position indicating means indicates that the permanent magnet is adjacent to an energized electromagnet;

a second means for sequentially energizing each electromagnet, first to a second state of opposite polarity having a first level that just neutralizes the residual magnetism in the last mentioned electromagnet when the position indicating means indicates that the permanent magnet is adjacent to an energized electromagnet, and then to a second state of opposite polarity having a second, higher level that repels the permanent magnet on the rotor and rotates the drive shaft in the first direction;

wherein when the second energizing means ceases energizing an electromagnet adjacent to one rotor the first energizing means energizes another electromagnet on another rotor and this sequence is repeated through all the plurality of rotors, and the sum of all the forces between permanent magnets and energized electromagnets on the plurality of rotors causes the drive shaft to rotate in the first direction.

2. The electromagnetic engine of claim 1 wherein each of the plurality of rotors has a first surface and a second surface on opposite sides of the rotors, and wherein the position indicating means comprises:

an elongated slot through each rotor near each of the first magnets;

a light source mounted in a fixed manner near the first surface of each of the rotors so that light emitted by the light sources will pass through the elongated slot as each rotor turns;

a photo-detector mounted in a fixed manner near the second surface of each of the rotors so that light passing through the elongated slot as each rotor turns will impinge on the photo-detector and cause a signal to be output there from; and means responsive to the signal output from a photo-detector to energize the electromagnets around the rotor through the elongated slot of which light from a light source is passing.

3. The electromagnetic engine of claim 2 wherein the elongated slots through the plurality of rotors are oriented with respect to each other so that light from the light source adjacent to each of the rotors will only pass through one elongated slot at a time through one of the rotors in a sequential manner as the drive shaft rotates.

4. The electromagnetic engine of claim 3 wherein the electromagnets adjacent to only one of the rotors at a time are energized due to the sequential manner in which light from the light sources passes through all the elongated slots through all rotors.

5. The electromagnetic engine of claim 4 wherein the sequential manner in which the light passes through the elongated slots through all the rotors causes all the electromagnets adjacent to all the rotors to be energized and attract first magnets in a sequential manner that cause the drive shaft of the electromagnetic engine to rotate smoothly in the first direction.

6. A method for rotating the drive shaft of a rotary engine that has a plurality of rotors that are fastened to a drive shaft, a plurality of permanent magnets that are mounted on each rotor, a plurality of electromagnets that are fixedly mounted adjacent to each of the rotors, means for indicating the position of each of the rotors as they turn in a first direction, and a power supply to drive the engine, the method comprising the steps of:
  (a) energizing the electromagnets adjacent to a rotor to a first polarity when the position indicating means indicates that permanent magnets on the last mentioned rotor are a predetermined number of degrees before rotating in the first direction to be opposite an energized electromagnet adjacent to the rotor;
  (b) de-energizing the electromagnets adjacent to the last mentioned rotor when the position indicating means indicates that the last mentioned magnet is permanent magnets are adjacent to the energized electromagnets on the rotor;
  (c) energizing the electromagnets adjacent to the last mentioned rotor to a second state of opposite polarity having a first level that just neutralizes the residual magnetism in the last mentioned electromagnets when the position indicating means indicates that the last mentioned permanent magnets are adjacent the electromagnets de-energized in step (b);
  (d) subsequently energizing the electromagnets adjacent to the last mentioned rotor to the second state of opposite polarity but having a second, higher level that repels the permanent magnets and thereby continues to rotate the drive shaft in the first direction;
  (e) repeating steps (a) through (d) for a different rotor that has not had its adjacent electromagnets energized and de-energized;
  (f) repeating steps (a) through (e) until all the plurality of rotors have had their adjacent electromagnets energized and de-energized; and
  (g) repeating steps (a) through (f);
  wherein when each fixedly mounted electromagnet is energized per step (a) it attracts the permanent magnets that are a predetermined number of degrees before being opposite to the electromagnet and that causes the drive shaft to rotate in the first direction, by then de-energizing each electromagnet per step (b) and then re-energizing the electromagnets per step (c) to an opposite polarity of a first level the drive shaft is permitted to continue rotating in the first direction without interference from residual magnetism, and by then re-energizing the electromagnets per step (d) to an opposite polarity of a second level the permanent magnets are repelled from the last mentioned electromagnets in the first direction; and
  wherein the sum of all the attractive and repelling forces between the permanent magnets and the energized electromagnets for all rotors causes the drive shaft to continue rotating in the first direction.

7. The method for rotating the drive shaft of an electrical engine in accordance with claim 6 further comprising the step of:
  (h) sensing when the position indicating means indicates that a permanent magnet on a rotor is a predetermined number of degrees before rotating in the first direction to be opposite an energized electromagnet adjacent to the rotor and then causing the energizing of the electromagnets in step (a).

* * * * *